US012793278B2

(12) United States Patent
Chao et al.

(10) Patent No.: US 12,793,278 B2
(45) Date of Patent: Nov. 10, 2026

(54) MULTIPLE SUB-MESHES ENCODING

(71) Applicant: TENCENT AMERICA LLC, Palo Alto, CA (US)

(72) Inventors: Fang-Yi Chao, Dublin (IE); Thuong Nguyen Canh, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 398 days.

(21) Appl. No.: 18/502,414

(22) Filed: Nov. 6, 2023

(65) Prior Publication Data

US 2024/0212218 A1 Jun. 27, 2024

Related U.S. Application Data

(60) Provisional application No. 63/435,517, filed on Dec. 27, 2022.

(51) Int. Cl.
*G06T 9/00* (2006.01)

(52) U.S. Cl.
CPC .................................... *G06T 9/001* (2013.01)

(58) Field of Classification Search
CPC ........... G06T 9/001; G06T 9/00; G06T 17/20; G06T 9/40; H04N 19/597; H04N 19/70; H04N 19/119
USPC .......................................................... 382/232
See application file for complete search history.

(56) References Cited

U.S. PATENT DOCUMENTS

2021/0090301 A1 3/2021 Mammou et al.
2025/0373850 A1* 12/2025 Park et al. ........... H04N 19/597

FOREIGN PATENT DOCUMENTS

EP 0611076 A2 * 8/1994 ............. G06F 15/72
JP 2004295917 A * 10/2004 ............. G06T 13/00

OTHER PUBLICATIONS

International Search Report dated Feb. 12, 2024 in International Application No. PCT/US2023/036915.
Written Opinion dated Feb. 12, 2024 in International Application No. PCT/US2023/036915.
Marvie et al., "Compression of Time-Varying Textured Meshes using Patch Tiling and Image-based Tracking" IEEE, Oct. 31, 2022 (6 pages total).
Ilodibia, "3D Model Transmission Over Wireless Channels", ProQuest, Mar. 2007, (50 pages total).
EP Search Report issued Mar. 24, 2026 in EP Application No. 23901753.6.

(Continued)

*Primary Examiner* — Matthew C Bella
(74) *Attorney, Agent, or Firm* — Sughrue Mion, PLLC

(57) ABSTRACT

A method and apparatus comprising computer code configured to cause a processor or processors to generate more than one sub-mesh from an input mesh using one or more cutting planes. The processors may also encode the more than one sub-mesh in a bitstream, the more than one sub-mesh being encoded using different quantization parameters, and encode connectivity information according to the more than one sub-mesh in the bitstream using at least one header in the bitstream. The processors may the transmit the bitstream over a network.

20 Claims, 12 Drawing Sheets

500

(56) References Cited

OTHER PUBLICATIONS

Simari Patricio et al: "Folding meshes: Hierarchical mesh segmentation based on planar symmetry", Eurographics Symposium on Geometry Processing (2006), Jun. 26, 2006, pp. 1-9.
"WD 1.0 of V-DMC", 140. MPEG Meeting; Oct. 24, 2022-Oct. 28, 2022; Mainz; (Motion Picture Expert Group or ISO/IEC JTC1/SC29/WG11), H04N No. n22184 G06T Dec. 6, 2022 (Dec. 6, 2022), 66 pages total.

* cited by examiner

300

400

450

550

580

600

750

MULTIPLE SUB-MESHES ENCODING

CROSS REFERENCE TO RELATED APPLICATION

The present application claims priority to U.S. Provisional Application No. 63/435,517 filed on Dec. 27, 2022, the disclosure of which is incorporated herein in its entirety.

FIELD

Embodiments of this disclosure are directed to video coding and decoding. Specifically, embodiments of the present disclosure are to encoding and decoding multiple sub-meshes including mesh separation and header design in mesh motion vector coding.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may include several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

As another example, glTF (GL Transmission Format) is standard being developed from the Khronos Group for the efficient transmission and loading of 3D scenes and models by applications. glTF aims to minimize both the size of 3D assets, and the runtime processing needed to unpack. A geometry compression extension to glTF 2.0 using Google Draco technology is being developed to reduce the size of glTF models and scenes.

SUMMARY

According to an embodiment, a method and apparatus comprising computer code configured to cause a processor or processors to generate more than one sub-mesh from an input mesh using one or more cutting planes. The processors may also encode the more than one sub-mesh in a bitstream, the more than one sub-mesh being encoded using different quantization parameters, and encode connectivity information according to the more than one sub-mesh in the bitstream using at least one header in the bitstream. The processors may the transmit the bitstream over a network.

According to an embodiment, a method and apparatus comprising computer code configured to cause a processor or processors to obtain, from a bitstream, more than one encoded sub-mesh representing an encoded volumetric data of at least one three-dimensional (3D) visual content, wherein at least two of the more than one encoded sub-mesh are encoded using different quantization parameters; obtain, from one or more headers in the bitstream, sub-mesh connectivity information corresponding to the more than one encoded sub-mesh; and generate a reconstructed mesh using the more than one encoded sub-mesh and the sub-mesh connectivity information.

According to an embodiment, a method and apparatus comprising computer code configured to cause a processor or processors to perform a conversion between a visual media file and a bitstream of a visual media data according to a format rule, wherein the bitstream includes one or more sub-mesh information headers and more than one encoded sub-meshes with corresponding sub-mesh headers; wherein the format rule specifies that a first syntax element and a second syntax element is included in a configuration record in the visual media file; wherein the first syntax element indicates a total number of sub-meshes encoded among the more than one encoded sub-mesh and a total number of connection pairs encoded among the more than one encoded sub-mesh, and wherein the second syntax element indicates each connection pair encoded among the more than one encoded sub-mesh.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
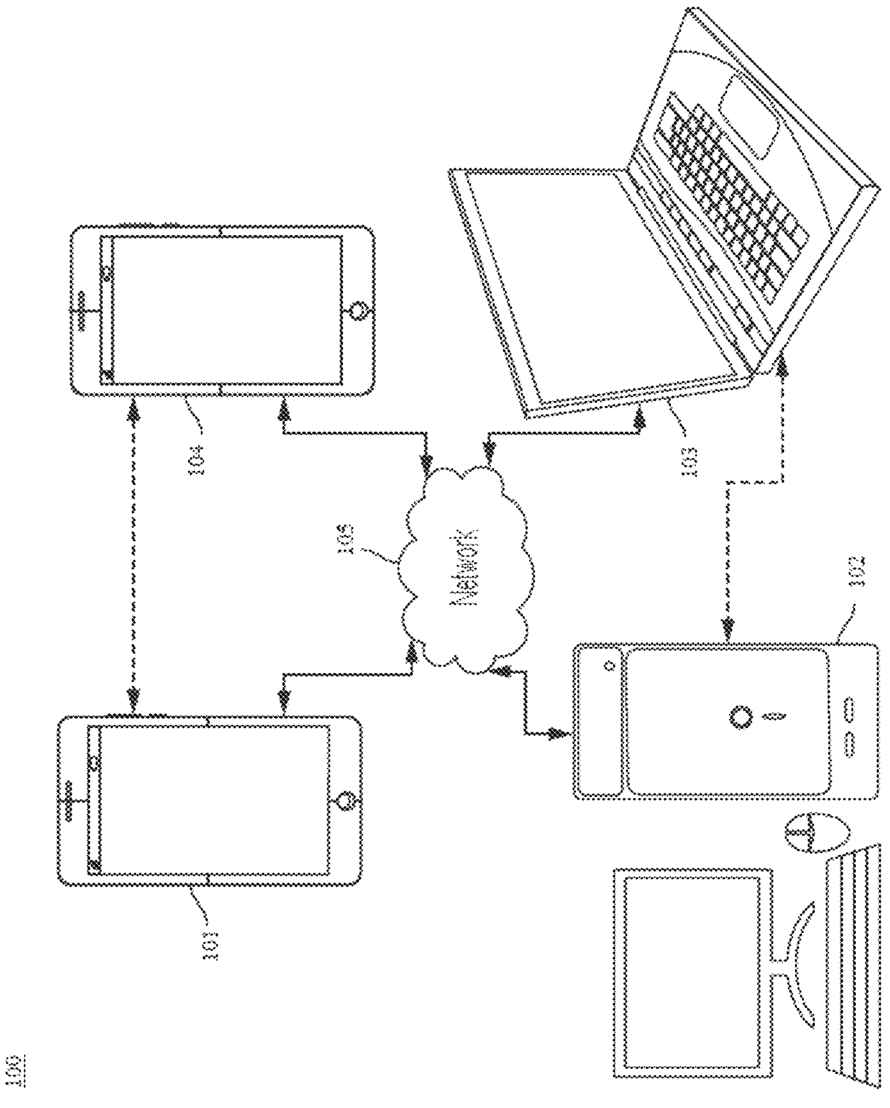
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
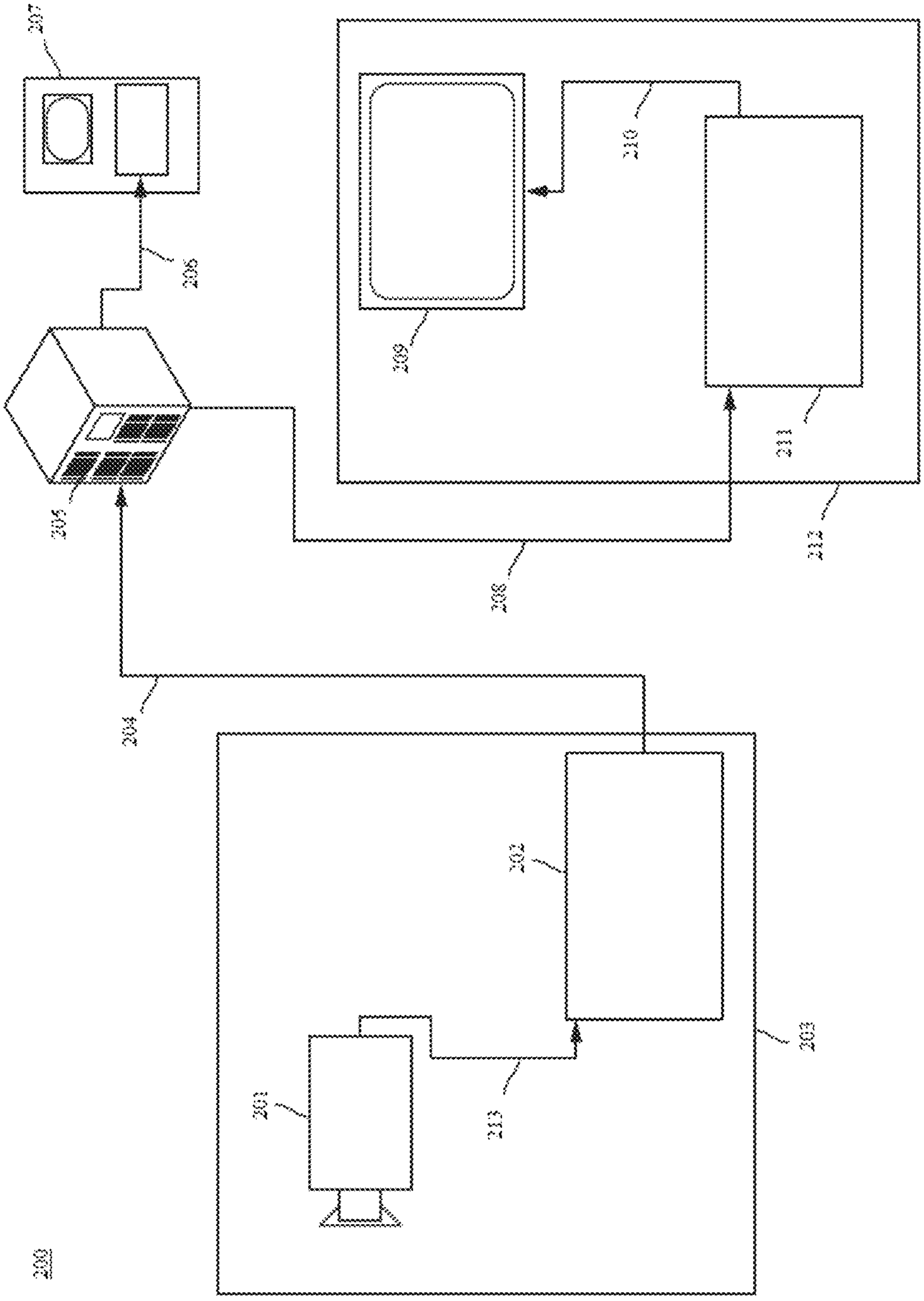
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 3:
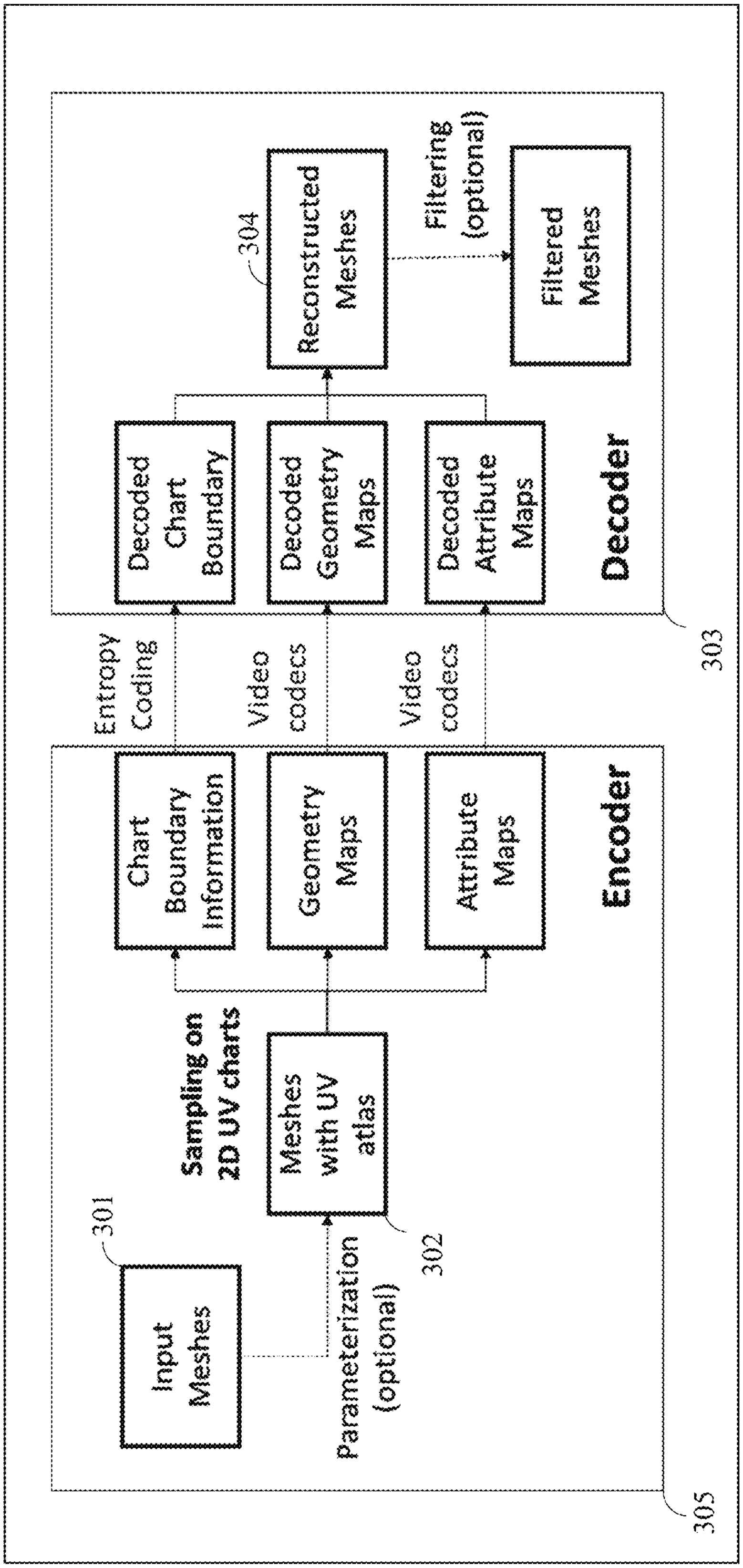
FIG. 3 is a schematic illustration of a simplified block diagram of a video encoder and decoder, in accordance with embodiments of the present disclosure.

FIG. 3 represents an example framework 300 of one dynamic mesh compression such as for a 2D atlas sampling based method. Each frame of the input meshes 301 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information. As illustrated in the example 400 of volumetric data in FIG. 4A, the UV parameterization process 402 of mapping from 3D mesh segments onto 2D charts, such as to the above noted 2D UV atlases 302 block, maps one or more mesh segments 401 onto a 2D chart 403 in the 2D UV atlas 404. Each vertex ($v_n$) in the mesh segment my be assigned with a 2D UV coordinates in the 2D UV atlas. Note that the vertices ($v_n$) in a 2D chart form a connected component as their 3D counterpart. The geometry, attribute, and connectivity information of each vertex can be inherited from their 3D counterpart as well. For example, information may be indicated that vertex v4 connects directly to vertices $v_0$, $v_5$, $v_1$, and $v_3$, and similarly information of each of the other vertices may also be likewise indicated. Further, such 2D texture mesh would, according to exemplary embodiments, further indicate information, such as color information, in a patch-by-patch basis such as by patches of each triangle, e.g., $v_2$, $v_5$, $v_3$ as one "patch".

Figure 4A:
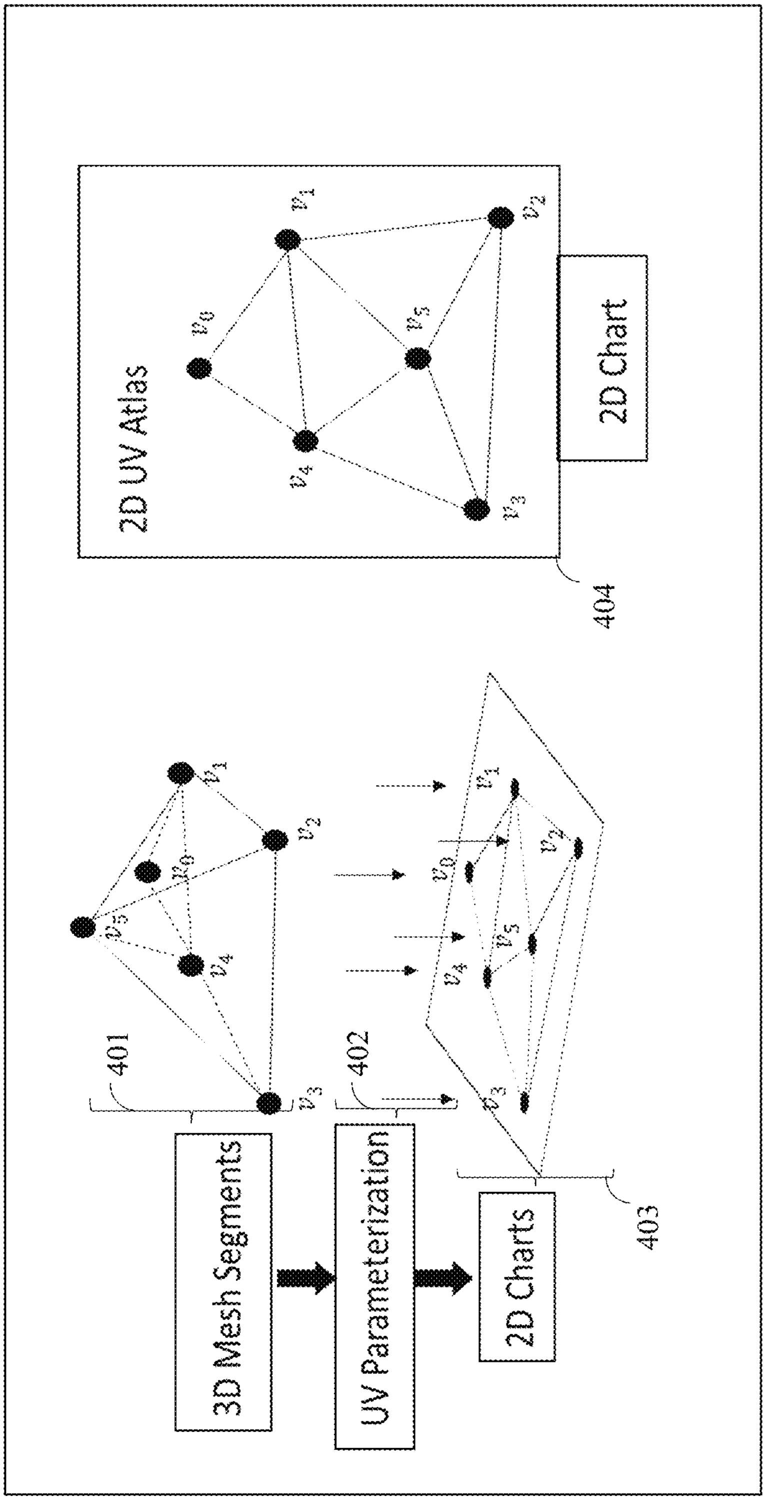
FIGS. 4A-B are exemplary illustrations of UV parameterization mapping from 3D mesh segments onto 2D charts, in accordance with embodiments of the present disclosure.
Figure 4B:
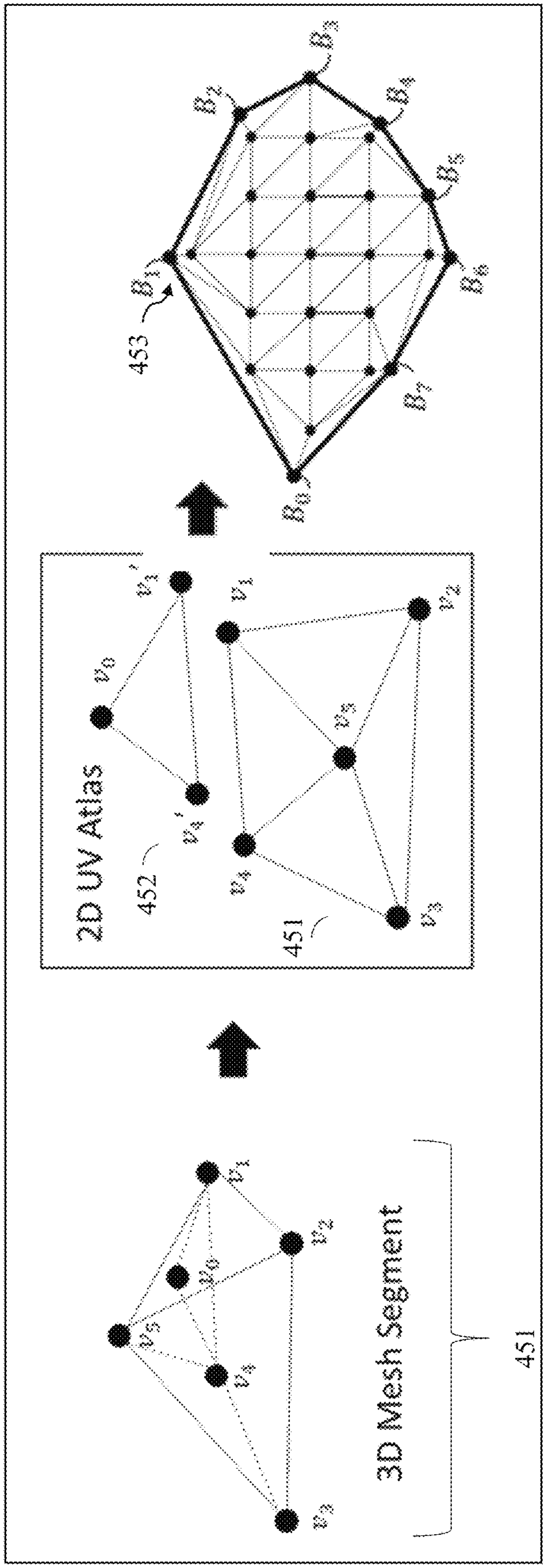

For example, further to the features of the example 400 of FIG. 4A, see the example 450 of FIG. 4B where the 3D mesh segment 451 can be also mapped to multiple separate 2D charts 451 and 452. In this case, a vertex in 3D could corresponds to multiple vertices in 2D UV atlas. As shown in FIG. 4B, the same 3D mesh segment is mapped to multiple 2D charts, instead of a single chart as in FIG. 4A, in the 2D UV atlas. For example, 3D vertices $v_1$ and $v_4$ each have two 2D correspondences $v_1$, $v_{1'}$, and $v_4$, $v_{4'}$, respectively. As such, a general 2D UV atlas of a 3D mesh may consist of multiple charts, where each chart may contain multiple (usually more than or equal to 3) vertices associated with their 3D geometry, attribute, and connectivity information.

FIG. 4B shows an example 453 illustrating a derived triangulation in a chart with boundary vertices $B_0$, $B_1$, $B_2$, $B_3$, $B_4$, $B_5$, $B_6$, $B_7$. When presented with such information, any triangulation method can be applied to create connectivity among the vertices (including boundary vertices and sampled vertices). For example, for each vertex, find the closest two vertices. Or for all vertices, continuously generate triangles until a minimum number of triangles is achieved after a set number of tries. As shown in the example 453, there are various regularly shaped, repeating triangles and various oddly shaped triangles, generally closest to the boundary vertices, having their own unique dimensions that may or may not be shared with any other of the triangles. The connectivity information can be also reconstructed by explicit signaling. If a polygon cannot be recovered by implicit rules, the encoder can signal the connectivity information in the bitstream according to exemplary embodiments.

Boundary vertices $B_0$, $B_1$, $B_2$, $B_3$, $B_4$, $B_5$, $B_6$, $B_7$ are defined in the 2D UV space. A boundary edge can be determined by checking if the edge is only appeared in one triangle. The following information of boundary vertices is significant and should be signaled in the bitstream according to exemplary embodiments: geometry information, e.g., the 3D XYZ coordinates even though currently in the 2D UV parametric form, and the 2D UV coordinates.

For a case in which a boundary vertex in 3D corresponds to multiple vertices in 2D UV atlas, such as shown in FIG. 4B, the mapping from 3D XUZ to 2D UV can be one-to-multiple. Therefore, a UV-to-XYZ (or referred to as UV2XYZ) index can be signaled to indicate the mapping function. UV2XYZ may be a 1D-array of indices that correspond each 2D UV vertex to a 3D XYZ vertex.

According to exemplary embodiments, to represent a mesh signal efficiently, a subset of the mesh vertices may be coded first, together with the connectivity information among them. In the original mesh, the connection among these vertices may not exist as they are subsampled from the original mesh. There are different ways to signal the connectivity information among the vertices, and such subset is therefore referred to as the base mesh or as base vertices.

According to exemplary embodiments, a number of methods are implemented for dynamic mesh compression and are part of the above-mentioned edge-based vertex prediction framework, where a base mesh is coded first and then more additional vertices are predicted based on the connectivity information from the edges of the base mesh. Note that they can be applied individually or by any form of combinations.

To optimize the quality and computation efficiency of mesh encoding, according to embodiments of the present disclosure, a mesh may be separated into multiple sub-meshes and then encoded with different quantization parameters. As an example, a first sub-mesh may be coded with a first set of quantization parameters and a second sub-mesh may be coded with a second set of quantization parameters. The coding information of sub-meshes, such as quantization parameters used, and connection to other sub-meshes may also be encoded in the header of the bitstream. The decoder may then decode the header and sub-meshes and use the information in the header to merge sub-meshes back into the initial mesh.

Embodiments of the present disclosure are directed to method and apparatuses to separate a mesh into multiple sub-meshes. The multiple sub-meshes may then be encoded with different parameters such as quantization in the encoder. The multiple sub-meshes may be decoded back to sub-meshes, and merged back into the initial mesh after the decoding.

An embodiments of the present disclosure is also directed to a new header in the bitstream to specify the information of encoded sub-meshes to help the decoder decode the sub-meshes and merge them back into the initial mesh. The steps, according to an embodiment, may include mesh separation, encoding multiple sub-meshes, header encoding, decoding the multiple sub-meshes, and merging the sub-meshes. The methods proposed in the present disclosure may be used separately or combined in any order and may be used for static meshes, dynamic meshes, arbitrary polygon meshes, and three-dimensional point clouds.

As stated above, a mesh may be divided into several sub-meshes. In an embodiment, if the sub-mesh to be separated is originally connected to other sub-meshes before the separation, the methods mentioned herein may be used.

In a first embodiments, a cutting plane may be used to cut them into 2 parts. More than one cutting plane may be used to separate the initial mesh into multiple sub-meshes. If there are faces in the mesh that go cross the cutting plane, new vertices and connectivity at the intersection of the cutting plane and the crossing faces may be added to separate the mesh. In an embodiment, if there is no face crossing the cutting plane. This may imply that the vertices lay directly on the cutting plane. These vertices and connectivity information are then duplicated to one of the sub-mesh and separate it from the other sub-mesh. In an embodiment where the mesh already has vertices and connectivity information on the cutting plane, the vertices and connectivity information may be directly duplicated to one of the sub-mesh and separated from the other sub-mesh.

Figure 5A:
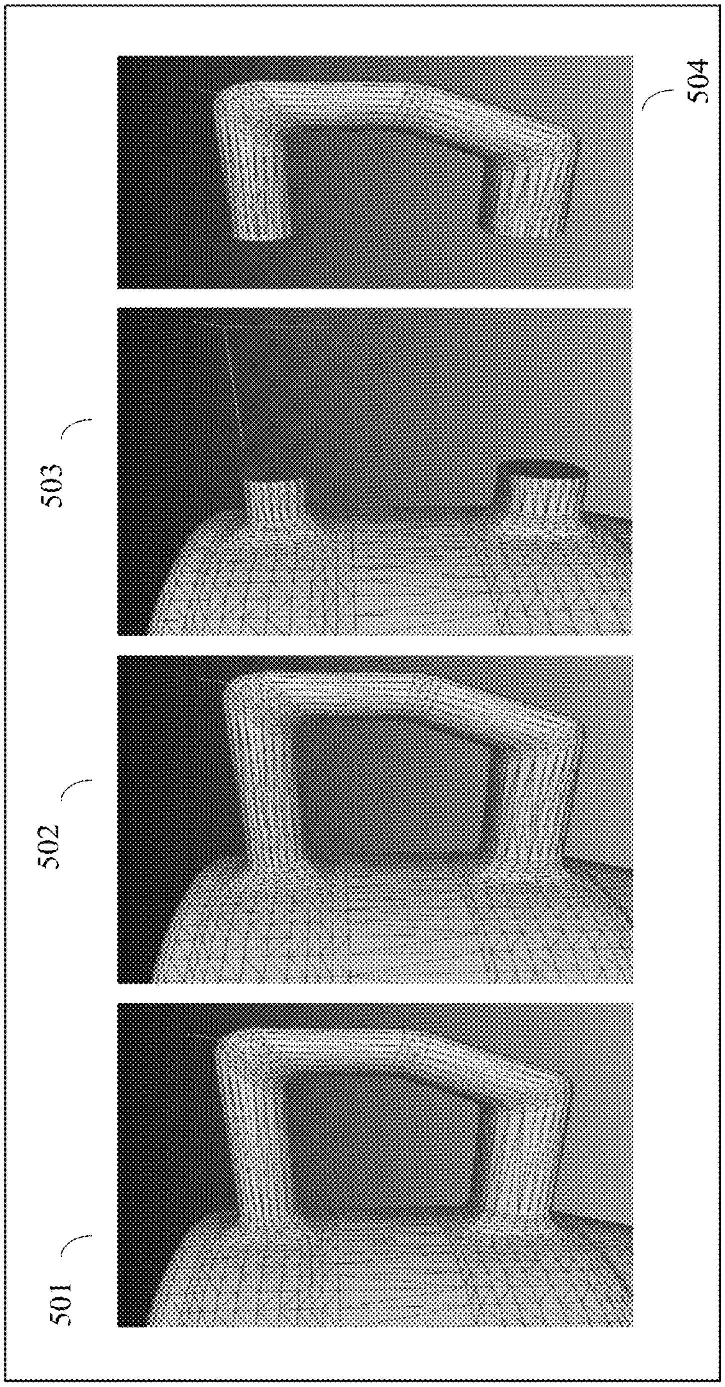
FIGS. 5A-B are exemplary illustrations of processes to separate a mesh into multiple sub-meshes, in accordance with embodiments of the present disclosure.

FIG. 5A displays an exemplary process 500 that illustrates mesh separation into multiple sub-meshes.

As shown at 501, a handle of a cup may be cut using a cutting plane. Since there are no vertices and connectivity on the cutting plane, new vertices may be added and connectivity information may be generated at the intersection of the cup handle and the cutting plane, as shown at 502. After the vertices and connectivity information on the cutting plane are determined, the vertices and connectivity information on the cutting plane may be duplicated to the handle, and the cup and the handle may be separated as shown at 503 and 504.

Regarding texture coordinates (and any other attribute, such as normal), new UV coordinates may be added on each newly added vertex. The new UV coordinates are computed with linear interpolation. For example, given a vertex $V_1$ and a vertex $V_2$, which has UV coordinates $UV_1$ and $UV_2$, respectively. A new vertex $V_{new}$ may be added in between $V_1$ and $V_2$. The UV coordinate $UV_{new}$ of $V_{new}$ is computed as:

$$UV_{new} = \text{weight} \times UV_1 + (1 - \text{weight}) \times UV_2 \quad \text{Eqn (1)}$$

where $$\text{weight} = \frac{|V_1 - V_{new}|}{|V_1 - V_2|}.$$

Please note that the same interpolation method may be used for adding other attributes, such as normal attribute, to the newly added vertices.

Figure 5B:
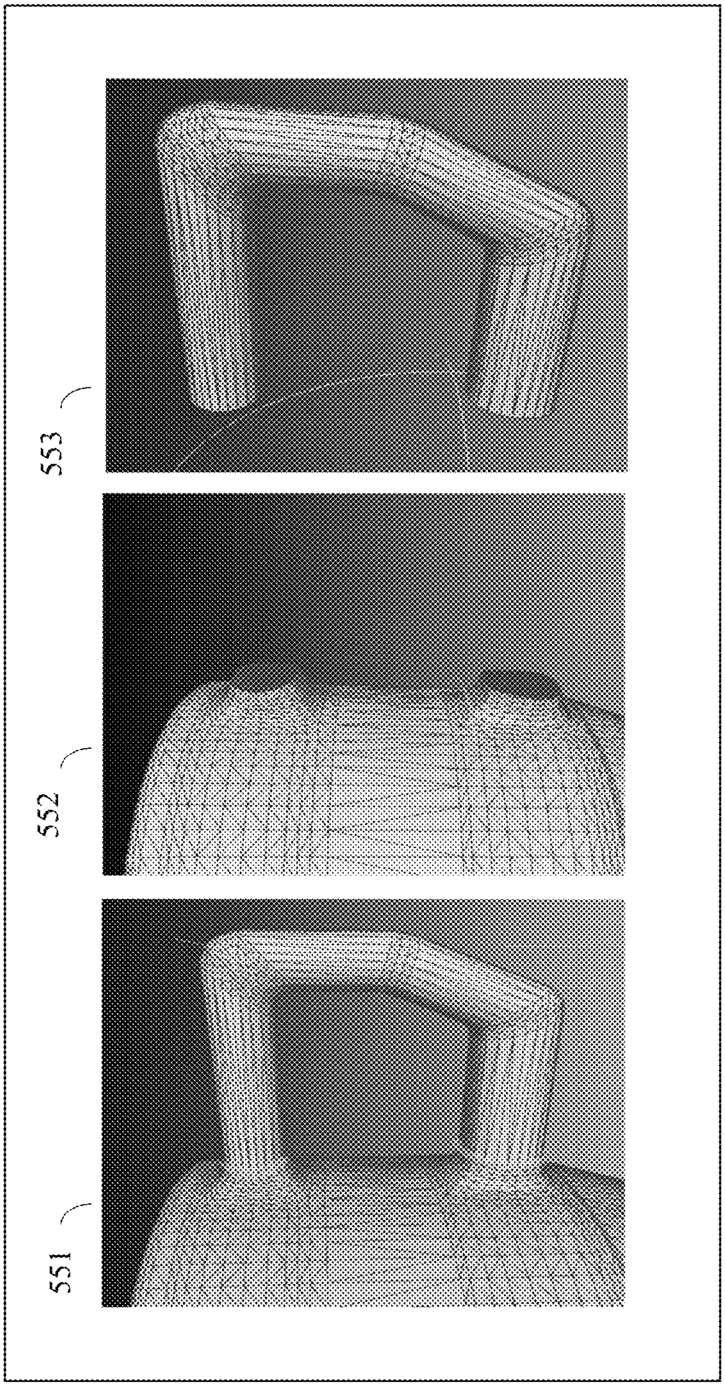

In a second or same embodiment for sub-mesh separation, the mesh may be divided along the edges of the mesh. The closest edge to the cutting plane may be found, the vertices and connectivity information on that edge may be duplicated to the sub-mesh to be cut off and separated into the sub-mesh along the edge. new vertices nor new UV coordinates may be added to the mesh. FIG. 5B displays an exemplary process 550 illustrating diving a mesh along its edge for mesh separation. The edge that is closest to the cutting plane may be highlighted as shown at 551. The vertices and connectivity information on the edge are may be duplicated to the handle. Thus, the handle may be separated from the cup, as shown at 552 and 553.

According to embodiments, the duplicated vertices and edges (if any) may be removed on the decoder side to merge the sub-meshes back. If the sub-mesh to be separated is not connected to any other sub-mesh, it may be separated directly.

The sub-meshes may be encoded individually with different quantization parameters. To prevent an obvious quality gap between sub-meshes, the quantization difference may be maintained within a certain threshold. As an example, the amount of quantization difference may be limited to within ±1 bit or other numbers of bits depending on the use case. Note that any attribute, like position attribute, texture coordinate attribute, or normal attribute, may have different quantization differences. For example, given a mesh that is separated into 2 sub-meshes. The first sub-mesh may be quantized by 8 bits for the position attribute, 7 bits for the texture coordinate attribute, and 6 bits for the normal attribute, the second sub-mesh may be quantized by 8±1 (8-1, 8 or 8+1) bits for position attributes, 7±2 (7−2, 7−1, 7, 7+1 or 7+2) bits for the texture coordinate attribute, and 6±3 bits for the normal attributes if the quantization difference is set to ±1, ±2, ±3 for the position, texture coordinate, and normal attribute, respectively.

In addition, add an option to quantize sub-meshes with individual quantization bounding boxes or the same quantization bounding box shared by all sub-meshes may be added. If using an individual quantization bounding box for each sub-mesh, embodiments of the present disclosure can have a smaller bit-depth for a smaller sub-mesh. The quality would be better but the bitstream size would be bigger. If using the same quantization bounding boxes for all sub-meshes, the bit-depth and quality would be the same as quantizing the original mesh without separation.

Header Design

An exemplary header design may include:

```
struct SubmeshGeneralHeader {
  submesh_number;
  connection_pair_number;
};
struct ConnectionPairHeader {
  connection_pair;
};
struct SubmeshHeader {
  is_symmetric;
  symmetric_mesh_id;
  qp_delta;
  qt_delta;
  qn_delta;
};
```

According to an embodiment, header information associated with the multiple sub-meshes and mesh separation may include SubmeshGeneralHeader may encode two syntax elements, including submesh_number that indictes the number of the total sub-meshes, and connection_pair_number that indicates the number of total connection pairs.

According to an embodiment, header information associated with the multiple sub-meshes and mesh separation may include ConnectedPairHeader which may encode each connection pair of all the sub-meshes, where connection_pair may be an array for the 2 sub-meshes that should be connected together. The length of the array is equal to 2×connection_pair_number. Note that there can be multiple cutting planes that separate a mesh into multiple sub-meshes and leads to multiple connection pairs. As an example, given a mesh that is separated into 4 sub-meshes, the first sub-mesh is connected to the second sub-mesh and the second sub-mesh is connected to the third sub-mesh. The submesh_number is 4, the connection_pair_number is 2, and the connection_pair is [1, 2, 2, 3].

According to an embodiment, header information associated with the multiple sub-meshes and mesh separation may include SubmeshHeader which encodes 4 syntax elements that indicate header information for each sub-mesh. is_symmetric may indicate if the sub-mesh is symmetric, and symmetric_mesh_id is the id of which sub-mesh this sub-mesh is symmetric to. The qp_delta, qt_delta, and qn_delta encode the quantization difference of the position attribute, the texture coordinate attribute, and the normal attribute respectively. As stated above, for 2 sub-meshes, the first sub-mesh may be quantized by 8 bits for the position attribute, 7 bits for the texture coordinate attribute, and 6 bits for the normal attribute, the second sub-mesh may be quantized by 8+1 (8−1, 8 or 8+1) bits for position attributes, 7+2 (7−2, 7−1, 7, 7+1 or 7+2) bits for the texture coordinate attribute, and 6+3 bits for the normal attributes if the quantization difference is set to qp_delta=+1, qt_delta=+2, and qn_delta=+3 for the position, texture coordinate, and normal attribute, respectively.

Figure 6:
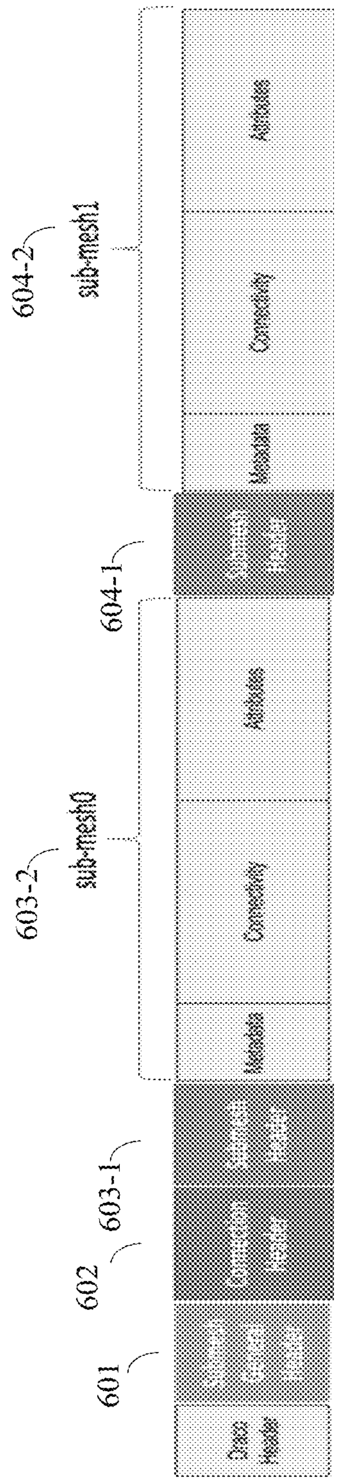
FIG. 6 is an exemplary illustration of structure of a bitstream encoding multiple sub-meshes, in accordance with embodiments of the present disclosure.

FIG. 6 illustrates an exemplary header 600. Embodiments use Draco coding as an example. Note that the codec for this header does not need to be Draco and may be any other mesh compression codec. In addition, the order of SubmeshGeneralHeader, ConncetionHeader, and SubmeshHeader in the bitstream can be changed as well. The number of sub-meshes can be more than 2. Note also that some information discussed to be put in the sub-mesh header, such as is_symmetric, symmetric_mesh_id, qp_delta, qt_delta, qn_delta, can also be put into the sub-mesh general header, as alternatives. In an embodiment, the SubmeshHeader may be placed at the beginning of the bitstream of each sub-mesh. In some embodiments, all the SubmeshHeader signaled in the bitstream prior to signaling the sub-mesh information.

According to an embodiment, an example syntax table for the decoding process based on Draco may be as follows in Table 1, where the bolded syntax elements are for the headers designed for sub-mesh encoding.

TABLE 1

| | Type |
|---|---|
| void Decode( ) { | |
| ParseHeader( ) | |
| **ParseSubmeshGeneralHeader( )** | |
| for (I = 0; I > connection_pair_number; ++I) { | |
| **ParseConnectionPairHeader(i);** | |
| } | |
| for (j=0; j < submesh_number; ++j){ | |
| **ParseSubmeshHeader(j);** | |
| if (flags & METADATA_FLAG_MASK){ | |
| DecodeMetadata(j); | |
| } | |
| DecodeConnectivityData(j); | |
| DecodeAttributeData(j); | |
| } | |
| } | |

The 3 bolded syntax elements from Table 1 are shown below in detail below as Tables 2, 3, and 4 respectively. Tables 2, 3, and 4 also include brief descriptors for their methods of coded representation, where u(n) is an unsigned integer using n bits, and i(n) is an integer using n bits. In one example, $$b_0 = 8, b_1 = 1, b_2 = 4.$$

TABLE 2

| | Type |
|---|---|
| void ParseSubmeshGeneralHeader( ){ | |
| submesh_number; | $u(b_0)$ |
| connection_pair_number; | $u(b_0)$ |
| } | |

TABLE 3

| | Type |
|---|---|
| void ParseConnectionPairHeader(index){ | |
| connection_pair(index); | $u(b_0)$ |
| } | |

TABLE 4

| | Type |
|---|---|
| void ParseSubmeshHeader(index){ | |
| is_symmetric[index]; | $u(b_1)$ |
| If (is_symmetric[index]){ | |
| symmetric_mesh_id[index]; | $u(b_0)$ |
| } | |
| qp_delta[index]; | $i(b_2)$ |
| qt_delta[index]; | $i(b_2)$ |
| qn_delta[index]; | $i(b_2)$ |
| } | |

According to embodiments, the decoder may decode the header and the sub-meshes sequentially in the bitstream. In the example discussed above, the information in the sub-mesh header is used to find the connected sub-meshes and merge them back into the initial mesh.

Connection_pair in the header may be used to find all the 2 sub-meshes that should be connected. Then the vertices on the cutting plane may be found and the on-plane vertices may be paired from between the 2 sub-meshes. The sub-meshes may be merged by finding the duplicate vertices. If the 2 sub-meshes were separated along edges, which means there may be no cutting plane, the vertices on the cutting edge are found and these vertices on the 2 sub-meshes may be paired. Then the duplicated vertices may be removed to merge the sub-meshes. The methods and procedures disclosed herein may be repeated until all connection pairs are connected and merged.

Figure 5C:
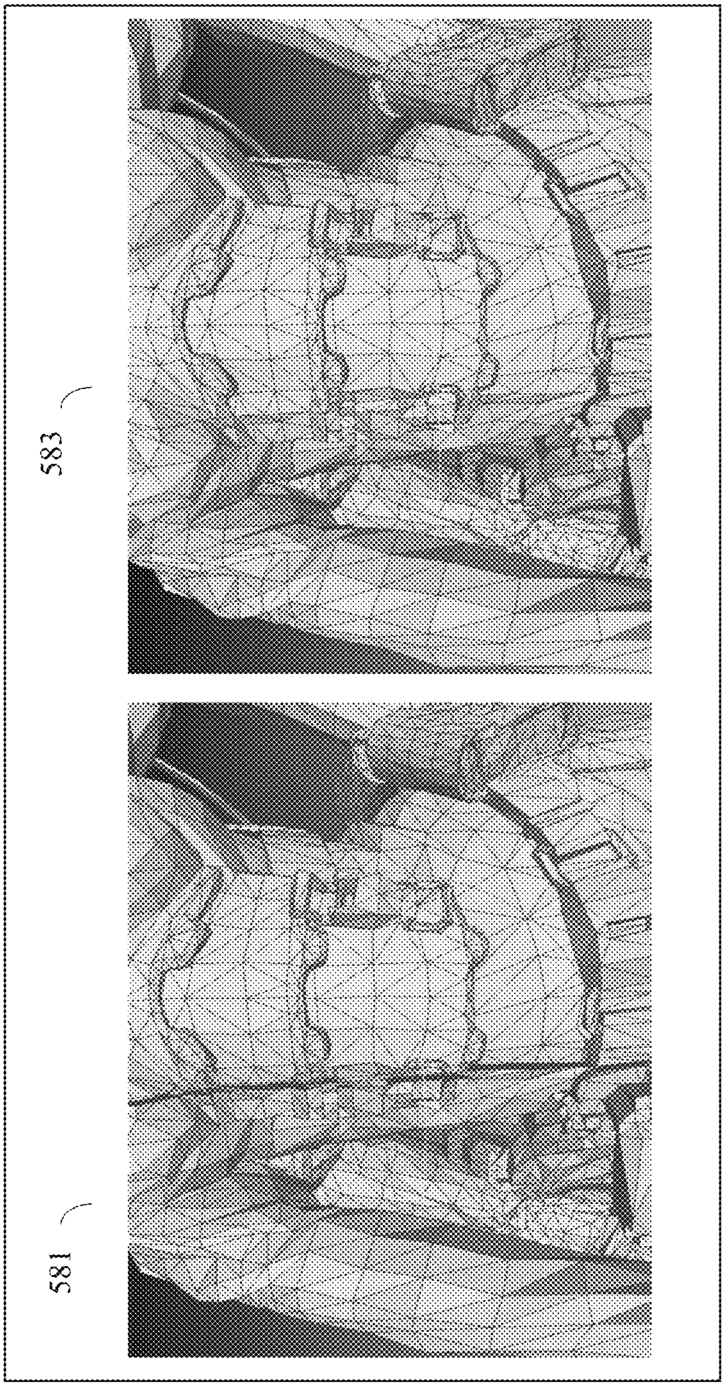
FIG. 5C is an exemplary illustration of merging multiple sub-meshes into the reconstructed mesh, in accordance with embodiments of the present disclosure.

When 2 sub-meshes were quantized with different parameters, there may be a gap between the 2 sub-meshes, as shown at 581 in FIG. 5C. To close the gap, the vertices on one side of the gap may be replaced with the vertices on the other side of the gap. The UV coordinates and other attributes may also be replaced. As shown at 583 in FIG. 5C, the vertices on the right side of the gap may be replaced with the vertices on the left side of the gap. Then, the duplicated vertices and connectivity information on the cutting plane may be found. The sub-meshes may be merged by removing the duplicated vertices and connectivity information.

The general algorithm is described in Table 5. Given 2 sub-meshes $\mathcal{M}_1$ and $\mathcal{M}_2$ that should be connected on the cutting plane p, where $\mathcal{M}_1$ has vertices $\mathcal{V}_1$, UV coordinates $\mathcal{U}_1$ and $\mathcal{M}_2$ has vertices $\mathcal{V}_2$, UV coordinates $\mathcal{U}_1$. The output merged mesh $M_{merged}$ has vertices $\mathcal{V}_{merged}$, and UV coordinates $\mathcal{U}_{merged}$.

TABLE 5

```
Input: 2 sub-meshes M_1, M_2, cutting plane p
if (p is not empty) {
  v_1onplane, I_1onplane = Find_onplane_vertices(v_1, p)
  v_2onplane, I_2onplane = Find_onplane_vertices(v_2, p)
  } else {
  v_1onplane, I_1onplane = Find_onedge_vertices(M_1)
  v_2onplane, I_2onplane = Find_onedge_vertices(M_2)
  }
pairIndex_1to2, err, v_1onplane, v_2onplane, I_1onplane, I_2onplane
      = Pair_vertices(v_1onplane, v_2onplane, I_1onplane, I_2onplane)
if (err > 0){
  v_2onplane =
```

TABLE 5-continued

```
  Replace_mismatch_vertices(v_1onplane, v_2onplane, PairIndex_1to2)
}
M_2 = Remove_duplicated_vertices(M_2, I_2onplane, I_1onplane, PairIndex_1to2)
M_merged = Merge_mesh(M_1, M_2, I_2onplane)
Output: a merged mesh M_merged
```

The operation $\mathcal{V}_{onplane}$, $I_{onplane}$=Find_onplane_vertices($\mathcal{V}$, p) is used to find the vertices $\mathcal{V}_{onplane}$ in $\mathcal{V}$ and their index $I_{onplane}$ that is on the cutting plane p. In specific, $$v_{onplane} = \{v_{onplane} | v_{onplane} \in v \text{ and } (v_{onplane} \cdot \vec{n}_p) - d_p = 0\} \quad \text{Eqn (2)}$$

Where $\vec{n}_p$ represents the normal vector, $d_p$ represents the displacement of the cutting plane p, and the operator • indicates the inner product.

The operation $\mathcal{V}_{onedge}$, $I_{onedge}$=Find_onedge_vertices($\mathcal{M}$) is used when the cutting plane p is empty, which means the sub-meshes were separated along edges. The disclosure uses the operation to find the vertices that are on the cutting edge. These on-edge vertices are defined as the vertices that only have one connectivity with other vertices in the mesh. For example at 451 and 451, any 2 connected vertices in the mesh have 2 connectivity between 2 adjacent faces, while the 2 connected vertices on the cutting edge only have one connectivity. The operation traverses all the faces in the sub-mesh $\mathcal{M}$ to find the vertices that only have one connectivity to the other vertices. In the case that there are vertices in the sub-mesh that only have one connectivity but are not on the cutting edge, they are removed on the procedure Pair_vertices(•).

The operation $PairIndex_{1to2}$, err=Pair_vertices($\mathcal{V}_{1onplane}$, $\mathcal{V}_{2onplane}$) is used to pair the vertices of the 2 sub-meshes that should be merged, where $PairIndex_{1to2}$ is the index table of vertices $\mathcal{V}_{1onplane}$ to the vertices $\mathcal{V}_{2onplane}$ that has the smallest distance $err_{1to2}$. Embodiments may use the KD tree algorithm to search for the vertices pairs that have the smallest distance.

There could be some vertices in $\mathcal{V}_{1onplane}$ or $\mathcal{V}_{2onplane}$ that are not on the edge. These vertices would lead to a big distance ($err_{1to2}$ or $err_{2to1}$) to their paired vertices. Embodiments may use the operation remove_vertices(•) to remove these vertices in $\mathcal{V}_{onplane}$ and its index in $I_{onplane}$ when it is found that the distance is bigger than a constant value $\epsilon$. The algorithm is described in Table 6.

TABLE 6

Method To Pair Vertices Of Two Sub-Meshes On The Cutting Plane

```
Input: V_1onplane, V_2onplane, I_1onplane, I_2onplane
Tree_1 = KDtree(V_1onplane)                              // build a KDtree
PairIndex_2to1, err_2to1 = Search (Tree_1, V_2onplane)   // search the nearest vertices
Tree_2 = KDtree(V_2_onplane)
PairIndex_1to2, err_1to2 = Search(Tree_2, V_1onplane)
If (err_2to1 > ε){
  err_2to1, V_2onplane, I_2onplane = remove_vertices(err_2to1, V_2onplane, I_2onplane, PairIndex_2to1)
}
If (err_1to2 > ε ){
  err_1to2, V_1onplane, I_1onplane = remove_vertices(err_1to2, V_1onplane, I_1onplane, PairIndex_1to2)
}
err = (err_2to1 + err_1to2)/2
Output: PairIndex_1to2, err, V_1onplane, V_2onplane, I_1onplane, I_2onplane
```

If err>0, the vertices pairs of $I_{1onplane}$ plane and $I_{2onplane}$ are mismatch due to different quantization parameters. To make the vertices pairs match with each other, embodiments may use the on-plane vertices of $\mathcal{V}_{1onplane}$ to replace the corresponding on-plane vertices of $\mathcal{V}_{2onplane}$.

This procedure is done by the operation:

$$v_{2_{onplane}} = \text{Replace\_mismatch\_vertices}\left(v_{1_{onplane}}, v_{2_{onplane}}, PairIndex_{1\,to\,2}\right) \quad \text{Eqn (3)}$$

TABLE 7

Method To Replace Mismatched Vertices.

```
Input: v_1onplane, v_2onplane, PairIndex_1to2
For v_1onplane = {v_1_1, ... , v_1_L} and v_2onplane = {v_2_1, ... , v_2_L}
for i from 1 to L {
  Index_v1 = PairIndex_1to2[i]
  v_2_i = v_1_index_v1
}
Output: v_2onplane
```

After this procedure, the pairs of on-plane vertices $\mathcal{V}_{1onplane}$ and $\mathcal{V}_{2onplane}$ are match with each other and have distance err=0. Then the duplicated vertices may be removed and merged with the sub-meshes in the following procedures.

If err=0, the vertices pairs of $I_{1onplane}$ and $I_{2onplane}$ are matched perfectly. Then the vertices and UV coordinates of $I_{2onplane}$ with $I_{1onplane}$ by using the operation $$\mathcal{M}_2 = \text{Remove\_duplicated\_vertices}\left(\mathcal{M}_2, I_{2_{onplane}}, I_{1_{onplane}}, PairIndex_{1\,to\,2}\right) \quad \text{Eqn (4)}$$

Table 8 shows the operation in detail. first $\text{PairIndex}_{1to2}$ is transferred from the index of on-plane vertices to the index of all the vertices by using the operation transfer_index(•). Then, all the faces $\mathcal{F}_2$ in $\mathcal{M}_2$ are reviewed and the vertices index $Iv_i$ and UV coordinates index $Iu_i$ are replaced with the corresponding vertices index $\text{PairIndex}_{1to2}(Iv_i)$ and $\text{PairIndex}_{1to2}(Iu_i)$ in $\mathcal{M}_1$, respectively.

TABLE 8

| Method To Remove Duplicated Vertices |
|---|
| Input: $\mathcal{M}_2, I_{2_{onplane}}, I_{1_{onplane}}, \text{PairIndex}_{1to2}$<br>$\text{PairIndex}_{1to2} = \text{transfer\_index}(\text{PairIndex}_{1to2}, I_{1_{onplane}}, I_{2_{onplane}})$<br>for $f = \{Iv_1, \ldots, Iv_K\}$, $u = \{Iu_1, Iu_2, \ldots, Iu_K\}$ in $\mathcal{F}_2$, {<br>for i from 1 to K − 1 {<br>if ($Iv_i \in I_{2_{onplane}}$) {<br>$Iv_i = \text{PairIndex}_{1to2}(Iv_i)$<br>$Iu_i = \text{PairIndex}_{1to2}(Iu_i)$<br>}<br>}<br>Output: $\mathcal{M}_2$ |

After the duplicated vertices and UV coordinates in $\mathcal{M}_2$ are removed, the 2 sub-meshes may be merged with the operation $$\mathcal{M}_{merged} = \text{Merge\_mesh}\left(\mathcal{M}_1, \mathcal{M}_2, I_{2_{onplane}}\right) \quad \text{Eqn (5)}$$

The disclosed method first concatenates the vertices $\mathcal{V}_1$, $\mathcal{V}_2$ and UV coordinates $\mathcal{U}_1$, $\mathcal{U}_2$, respectively. The disclosed method then goes through all the faces $\mathcal{F}_2$ in $\mathcal{M}_1$. If the vertices index $Iv_i$ is not in $I_{2onplane}$, the disclosed method adds an offset value $n_{v_1}$, which is the number of vertices $v_1$, to $Iv_i$, and add an offset value $n_{u_1}$, which is the number of vertices $\mathcal{U}_1$, to $Iu_i$.

TABLE 9

| Method to Merge Sub-Meshes |
|---|
| Input: $\mathcal{M}_1, \mathcal{M}_2, I_{2_{onplane}}$<br>$\mathcal{V}_{merged} = \text{concatenate}(\mathcal{V}_1, \mathcal{V}_2)$<br>$\mathcal{U}_{merged} = \text{concatenate}(\mathcal{U}_1, \mathcal{U}_2)$<br>$\text{offset}_{v_1} = \text{length}(\mathcal{V}_1)$<br>$\text{offset}_{u_1} = \text{length}(\mathcal{U}_1)$<br>for $f_2 = \{Iv_1, \ldots, Iv_K\}, u_2 = \{Iu_1, Iu_2, \ldots, Iu_K\}$ in $\mathcal{F}_2$ {<br>if ($Iv_i \notin I_{2_{onplane}}$) {<br>$Iv_i = Iv_i + \text{offset}_{v_1}$<br>$Iu_i = Iu_i + \text{offset}_{u_1}$<br>}<br>}<br>$\mathcal{F}_{merged} = \text{concatenate}(\mathcal{F}_1, \mathcal{F}_2)$<br>Output: $\mathcal{M}_{merged}$ |

After all the connected sub-meshes are merged, the merged sub-meshes and other sub-meshes that are not connected to other sub-meshes are concatenated together and restored as the initial input mesh. Given the sub-mesh $\mathcal{M}_1$ that are already merged from other connected part and the sub-mesh $\mathcal{M}_2$ that is not connected to other sub-meshes, the disclosed method may concatenate them by using the algorithm described in Table 10.

TABLE 10

| Method to Concatenate Sub-Meshes |
|---|
| Input: $\mathcal{M}_1, \mathcal{M}_2$<br>$\mathcal{V}_{concat} = \text{concatenate}(\mathcal{V}_1, \mathcal{V}_2)$<br>$\mathcal{U}_{concat} = \text{concatenate}(\mathcal{U}_1, \mathcal{U}_2)$<br>$\text{offset}_{v_1} = \text{length}(\mathcal{V}_1)$<br>$\text{offset}_{u_1} = \text{length}(\mathcal{U}_1)$<br>for $f_2 = \{Iv_1, \ldots, Iv_K\}$, $u_2 = \{Iu_1, Iu_2, \ldots, Iu_K\}$ in $\mathcal{F}_2$ {<br>$Iv_i = Iv_i + \text{offset}_{v_1}$<br>$Iu_i = Iu_i + \text{offset}_{u_1}$<br>}<br>}<br>$\mathcal{F}_{concat} = \text{concatenate}(\mathcal{F}_1, \mathcal{F}_2)$<br>Output: $\mathcal{M}_{concat}$ |

Figure 7A:
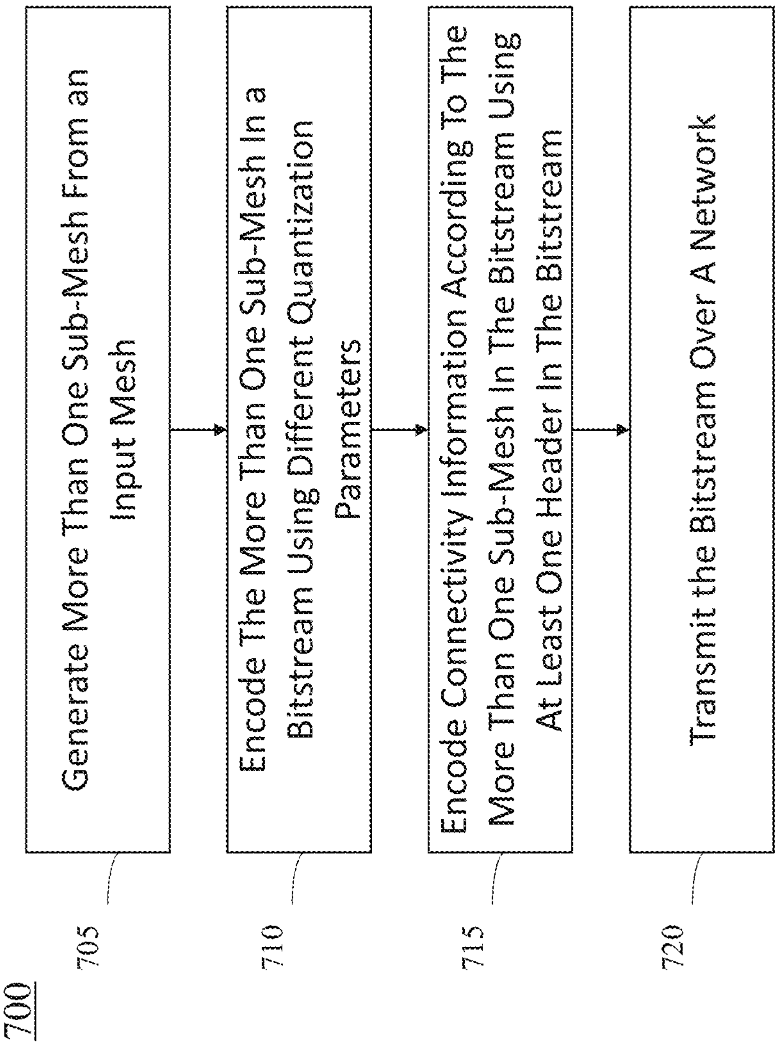
FIG. 7A is an exemplary process for mesh compression or encoding, in accordance with embodiments of the present disclosure.

FIG. 7A illustrates a process 700 for encoding multiple sub-meshes and encoding connectivity information for the multiple sub-meshes, according to an embodiment.

At operation 705, more than one sub-mesh from a received mesh or an input mesh may be generated using one or more cutting planes.

In an embodiment, generating the more than one sub-mesh may include determining a cutting plane to separate the received mesh into two sub-meshes; in response to determining that one or more faces in the received mesh is intersected by the cutting plane, determine points in the cutting plane at one or more intersections; and separating the received mesh into the two sub-meshes by adding the determined points as vertices in the two sub-meshes.

In another or same embodiment, generating the more than one sub-mesh may include determining a cutting plane along an edge of the received mesh to separate the received mesh into two sub-meshes; responsive to determining the cutting plane, determine one or more vertices along the edge of the received mesh; and separating the received mesh into the two sub-meshes by adding the determined points as vertices in the two sub-meshes.

At operation 710, the more than one sub-mesh may be encoded in a bitstream using different quantization parameters. In some embodiments, the different quantization parameters may include any combination of at least two position quantization parameters; at least two texture coordinate quantization parameters; and at least two normal quantization parameters.

At operation 715, connectivity information according to the more than one sub-mesh may be encoded in the bitstream using at least one header in the bitstream.

In some embodiments, the encoding may include encoding a sub-mesh general header. The sub-mesh general header may include a first syntax element that indicates a total number of sub-meshes generated among the more than one sub-mesh; and a second syntax element that indicates a total number of connection pairs generated among the more than one sub-mesh, wherein the sub-mesh general header may be associated with the received mesh.

In some embodiments, the encoding may include encoding connectivity information using a connection header. The connection header, the connection header may include a third syntax element that indicates each connection pair generated among the more than one sub-mesh, wherein the third syntax element is an array comprising a list of sub-mesh pairs that were connected to each other among the more than one sub-mesh, and wherein the connection header is associated with the received mesh.

In some embodiments, the encoding may include encoding a sub-mesh header associated with each sub-mesh. The sub-mesh header may include a fourth syntax element that indicates whether a respective sub-mesh is symmetric; when the fourth syntax element indicates that the respective sub-mesh is symmetric, a fifth syntax element that indicates a symmetric mesh id the respective mesh is symmetric to; a sixth syntax element that indicates a first quantization difference between at least two position quantization parameters; a seventh syntax element that indicates a second quantization difference between at least two texture coordinate quantization parameters; and an eighth syntax element that indicates a third quantization difference between at least two normal quantization parameters, wherein the sub-mesh header is associated with the respective sub-mesh of the more than one sub-mesh.

At operation 720, the bitstream may be transmitted over a network. The bitstream may include the encoded more than one sub-mesh and the encoded connectivity information.

At operation 720, the transmission may include performing a conversion between a visual media file and a bitstream of a visual media data according to a format rule, wherein the bitstream includes one or more sub-mesh information headers and more than one encoded sub-meshes with corresponding sub-mesh headers; wherein the format rule specifies that a first syntax element and a second syntax element is included in a configuration record in the visual media file, wherein the first syntax element indicates a total number of sub-meshes encoded among the more than one encoded sub-mesh and a total number of connection pairs encoded among the more than one encoded sub-mesh, and wherein the second syntax element indicates each connection pair encoded among the more than one encoded sub-mesh.

Figure 7B:
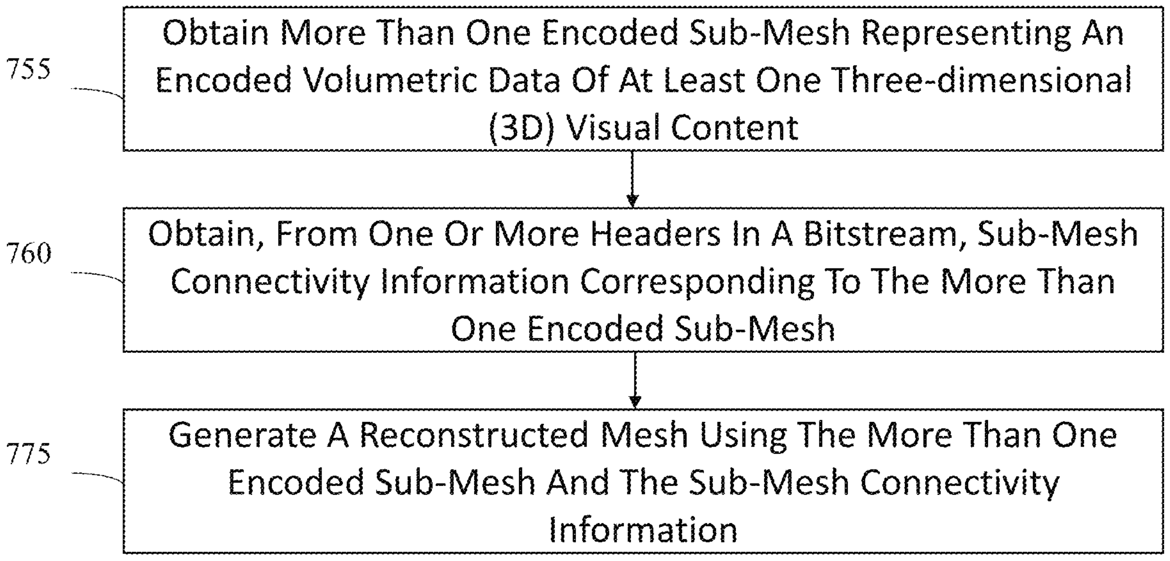
FIG. 7B is an exemplary process for mesh compression or decoding, in accordance with embodiments of the present disclosure.

FIG. 7B illustrates a process 750 for decoding multiple sub-meshes and decoding connectivity information to generate the reconstructed mesh, according to an embodiment.

At operation 755, more than one encoded sub-mesh representing an encoded volumetric data of at least one three-dimensional (3D) visual content may be obtained from a coded bitstream. In some embodiments, at least two of the more than one encoded sub-mesh may be encoded using different quantization parameters.

At operation 760, sub-mesh connectivity information corresponding to the more than one encoded sub-mesh may be obtained from one or more headers in the bitstream.

In some embodiments, obtaining the sub-mesh connectivity information may include obtaining general sub-mesh information from a sub-mesh general header. The general sub-mesh information may include a first syntax element that indicates a total number of sub-meshes encoded among the more than one encoded sub-mesh; and a second syntax element that indicates a total number of connection pairs encoded among the more than one encoded sub-mesh.

In some embodiments, obtaining the sub-mesh connectivity information may include obtaining connection information from a connection header. The connection information may include a third syntax element that indicates each connection pair encoded among the more than one encoded sub-mesh.

In some embodiments, obtaining the sub-mesh connectivity information may include obtaining sub-mesh information associated with a respective sub-mesh from the respective sub-mesh header. The sub-mesh information may include a fourth syntax element that indicates whether a respective sub-mesh is symmetric; when the fourth syntax element indicates that the respective sub-mesh is symmetric, a fifth syntax element that indicates a symmetric mesh id the respective mesh is symmetric to; a sixth syntax element that indicates a first quantization difference between at least two position quantization parameters; a seventh syntax element that indicates a second quantization difference between at least two texture coordinate quantization parameters; and an eighth syntax element that indicates a third quantization difference between at least two normal quantization parameters.

At operation 775, a reconstructed mesh may be generated using the more than one encoded sub-mesh and the sub-mesh connectivity information.

In an embodiment, generating the reconstructed mesh may include obtaining, from the sub-mesh connectivity information, connection pair information that indicates each connection pair encoded among the more than one encoded sub-mesh; in response to determining that a cutting plane was used to separate at least two sub-meshes, merging the at least two sub-meshes among the more than one encoded sub-mesh based on determining on-plane vertices from the at least two sub-meshes; and concatenating the at least two sub-meshes.

In an embodiment, generating the reconstructed mesh may include obtaining, from the sub-mesh connectivity information, connection pair information that indicates each connection pair encoded among the more than one encoded sub-mesh; in response to determining that at least two sub-meshes were separated along an edge, merging the at least two sub-meshes among the more than one encoded sub-mesh based on pairing one or more vertices along the edge of a first sub-mesh of the at least two sub-meshes with one or more vertices along the edge of a second sub-mesh of the at least two sub-meshes; and concatenating the at least two sub-meshes.

The proposed methods may be used separately or combined in any order. The proposed methods may be used for arbitrary polygon mesh, but even though only a triangle mesh may have been used for demonstration of various embodiments. As noted above, it will be assumed that an input mesh may contain one or multiple instances, that a sub-mesh is a part of input mesh with an instance or multiple instances, and that multiple instances can be grouped to form a sub-mesh.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
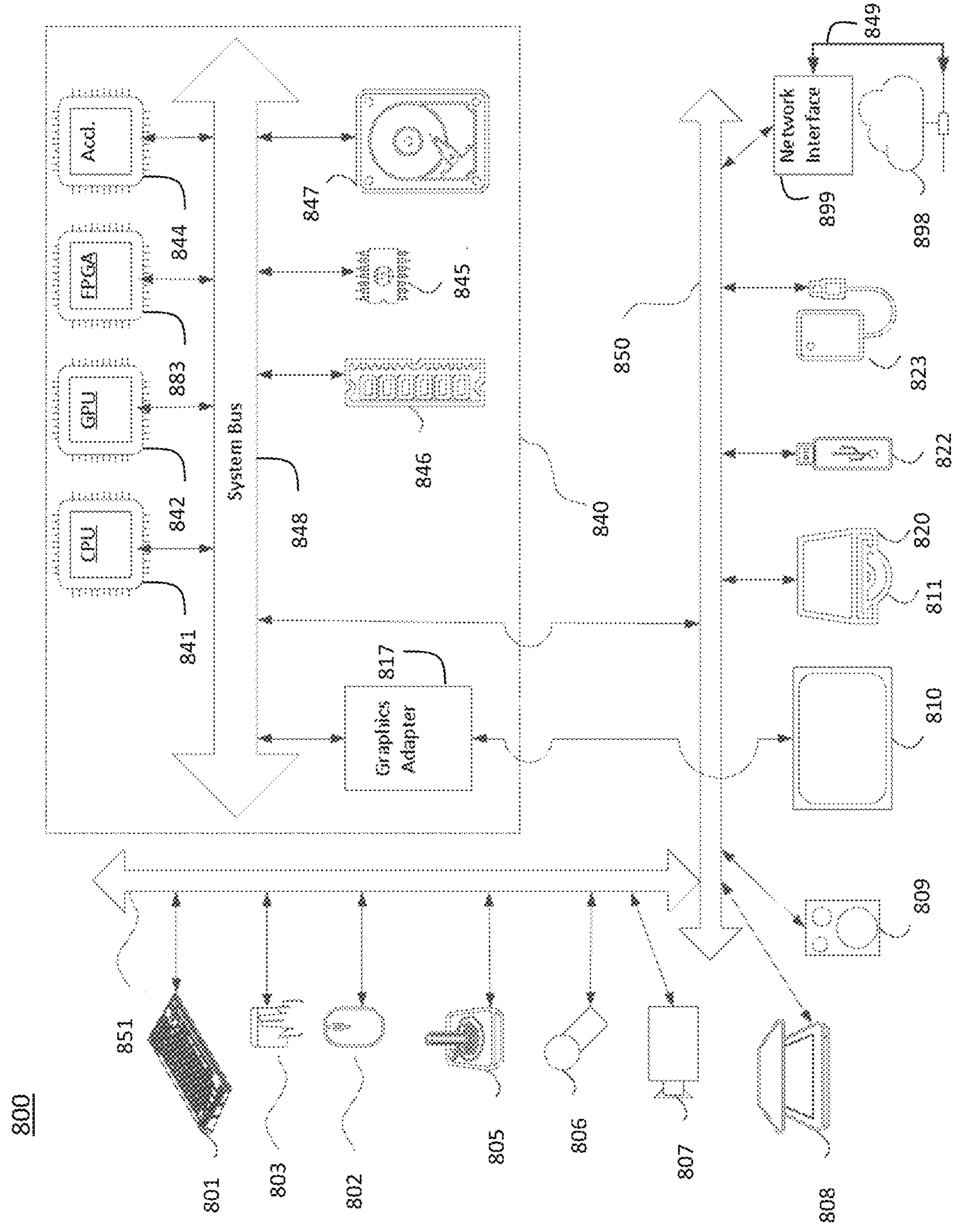
FIG. 8 is an exemplary diagram of a computer system suitable for implementing embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (750 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to

What is claimed is:

1. A method for mesh compression, the method being performed by at least one processor, the method comprising:

generating more than one sub-mesh from a received mesh using one or more cutting planes, the generating comprising:

determining a cutting plane that separates the received mesh into at least two sub-meshes comprising a first sub-mesh that comprises a symmetric part and a second sub-mesh that comprises a non-symmetric part;

encoding the more than one sub-mesh in a bitstream, the more than one sub-mesh being encoded using different quantization parameters;

encoding connectivity information according to the more than one sub-mesh in the bitstream using at least one header in the bitstream, wherein the at least one header comprises a sub-mesh general header with a first syntax element that indicates a total number of sub-meshes generated among the more than one sub-mesh, a second syntax element that indicates a total number of connection pairs generated among the more than one sub-mesh, and a third syntax element that indicates whether a respective sub-mesh is symmetric; and transmitting the bitstream over a network, wherein the third syntax element is a first value indicating that the first sub-mesh comprises the symmetric part and a second value indicating that the second sub-mesh comprises the non-symmetric part.

2. The method of claim 1, wherein the generating the more than one sub-mesh comprises:

in response to determining that one or more faces in the received mesh is intersected by the cutting plane, determine points in the cutting plane at one or more intersections; and separating the received mesh into the two sub-meshes by adding the determined points as vertices in the two sub-meshes.

3. The method of claim 1, wherein the generating the more than one sub-mesh comprises:

determining the cutting plane along an edge of the received mesh to separate the received mesh into the at least two sub-meshes;

responsive to determining the cutting plane, determine one or more vertices along the edge of the received mesh; and separating the received mesh into the at least two sub-meshes by adding the determined points as vertices in the two sub-meshes.

4. The method of claim 1, wherein the different quantization parameters comprise:

at least two position quantization parameters;

at least two texture coordinate quantization parameters; and at least two normal quantization parameters.

5. The method of claim 2, wherein the cutting plane separates the symmetric part and the non-symmetric part; and wherein the sub-mesh general header is associated with the received mesh.

6. The method of claim 1, wherein encoding the connectivity information further comprises:

encoding a connection header, the connection header comprising:

a fourth syntax element that indicates each connection pair generated among the more than one sub-mesh, wherein the fourth syntax element is an array comprising a list of sub-mesh pairs that were connected to each other among the more than one sub-mesh, and wherein the connection header is associated with the received mesh.

7. The method of claim 6, wherein encoding the connectivity information further comprises:

encoding a sub-mesh header, the sub-mesh header comprising:

a fifth syntax element that indicates a symmetric mesh id to which a respective mesh is symmetric;

a sixth syntax element that indicates a first quantization difference between at least two position quantization parameters;

a seventh syntax element that indicates a second quantization difference between at least two texture coordinate quantization parameters; and an eighth syntax element that indicates a third quantization difference between at least two normal quantization parameters;

wherein the sub-mesh header is associated with the respective sub-mesh of the more than one sub-mesh.

8. A non-transitory computer-readable medium storing instructions, the instructions comprising: one or more instructions that, when executed by one or more processors of a device for mesh compression, cause the one or more processors to perform the method of claim 1.

9. An apparatus for mesh compression, the apparatus comprising:

at least one memory configured to store program code; and at least one processor configured to read the program code and operate as instructed by the program code, the program code including:

first generating code configured to cause the at least one processor to determine more than one sub-mesh from a received mesh using one or more cutting planes, the first generating code further comprising second determining code configured to cause the at least one processor to:

determine a cutting plane that separates the received mesh into at least two sub-meshes comprising a first sub-mesh that comprises a symmetric part and a second sub-mesh that comprises a non-symmetric part;

first encoding code configured to cause the at least one processor to encode the more than one sub-mesh in a bitstream, the more than one sub-mesh being encoded using different quantization parameters;

second encoding code configured to cause the at least one processor to encode connectivity information according to the more than one sub-mesh in the bitstream using at least one header in the bitstream, wherein the at least one header comprises a sub-mesh general header with a first syntax element that indicates a total number of sub-meshes generated among the more than one sub-mesh, a second syntax element that indicates a total number of connection pairs generated among the more than one sub-mesh, and a third syntax element that indicates whether a respective sub-mesh is symmetric; and first transmitting code configured to cause the at least one processor to transmit the bitstream over a network, wherein the third syntax element is a first value indicating that the first sub-mesh comprises the symmetric part and a second value indicating that the second sub-mesh comprises the non-symmetric part.

10. The apparatus of claim 9, wherein the first generating code further comprises:

third determining code configured to cause the at least one processor to determine, in response to determining that one or more faces in the received mesh is intersected by the cutting plane, points in the cutting plane at one or more intersections; and separating code configured to cause the at least one processor to separate the received mesh into the two sub-meshes by adding the determined points as vertices in the two sub-meshes.

11. The apparatus of claim 9, wherein the first generating code further comprises:

fourth determining code configured to cause the at least one processor to determine the cutting plane along an edge of the received mesh to separate the received mesh into the at least two sub-meshes;

fifth determining code configured to cause the at least one processor to determine, responsive to determining the cutting plane, one or more vertices along the edge of the received mesh; and second separating code configured to cause the at least one processor to separate the received mesh into the at least two sub-meshes by adding the determined points as vertices in the two sub-meshes.

12. The apparatus of claim 9, wherein the different quantization parameters comprise:

at least two position quantization parameters;

at least two texture coordinate quantization parameters; and at least two normal quantization parameters.

13. The apparatus of claim 10, wherein the cutting plane separates the symmetric part and the non-symmetric part; and wherein the sub-mesh general header is associated with the received mesh.

14. The apparatus of claim 9, wherein the second encoding code further comprises:

third encoding code configured to cause the at least one processor to encode a connection header, the connection header comprising:

a fourth syntax element that indicates each connection pair generated among the more than one sub-mesh, wherein the fourth syntax element is an array comprising a list of sub-mesh pairs that were connected to each other among the more than one sub-mesh, and wherein the connection header is associated with the received mesh.

15. The apparatus of claim 9, wherein the second encoding code further comprises:

fourth encoding code configured to cause the at least one processor to encode a sub-mesh header, the sub-mesh header comprising:

a fifth syntax element that indicates a symmetric mesh id to which a respective mesh is symmetric;

a sixth syntax element that indicates a first quantization difference between at least two position quantization parameters;

a seventh syntax element that indicates a second quantization difference between at least two texture coordinate quantization parameters; and an eighth syntax element that indicates a third quantization difference between at least two normal quantization parameters;

wherein the sub-mesh header is associated with the respective sub-mesh of the more than one sub-mesh.

16. A method of processing visual media data, comprising:

performing a conversion between a visual media file and a bitstream of a visual media data according to a format rule, wherein the bitstream includes one or more sub-mesh information headers and more than one encoded sub-meshes with corresponding sub-mesh headers, the more than one encoded sub-meshes comprising a first sub-mesh that comprises a symmetric part and a second sub-mesh that comprises a non-symmetric part, wherein the format rule specifies that a first syntax element and a second, a second syntax element, and a third syntax element is included in a configuration record in the visual media file, wherein the first syntax element indicates a total number of sub-meshes encoded among the more than one encoded sub-mesh and a total number of connection pairs encoded among the more than one encoded sub-mesh, and wherein the second syntax element indicates each connection pair encoded among the more than one encoded sub-mesh, wherein the third syntax element indicates whether a respective sub-mesh is symmetric, and wherein the third syntax element is a first value indicating that the first sub-mesh comprises the symmetric part and a second value indicating that the second sub-mesh comprises the non-symmetric part.

17. The method of claim 16, wherein the format rule further specifies that a fourth syntax element is included in the configuration record in the visual media file, wherein the fourth syntax element that indicates each connection pair generated among the more than one sub-mesh, and wherein the fourth syntax element is an array comprising a list of sub-mesh pairs that were connected to each other among the more than one sub-mesh.

18. The method of claim 17, wherein the format rule further specifies that a sub-mesh header is included in the configuration record in the visual media file, and wherein the sub-mesh header comprises:

a fifth syntax element that indicates a symmetric mesh id the respective to which a respective mesh is symmetric.

19. The method of claim 18, wherein the sub-mesh header further comprises:

a sixth syntax element that indicates a first quantization difference between at least two position quantization parameters; and a seventh syntax element that indicates a second quantization difference between at least two texture coordinate quantization parameters.

20. The method of claim 19, wherein the sub-mesh header further comprises:

an eighth syntax element that indicates a third quantization difference between at least two normal quantization parameters.

* * * * *